United States Patent [19]

Gamble

[11] 4,409,439
[45] Oct. 11, 1983

[54] CONTROLLABLE TELEPHONE CALL ANNUNCIATOR

[76] Inventor: Barry I. Gamble, 9175 Poplar Ave., Cotati, Calif. 94928

[21] Appl. No.: 257,362

[22] Filed: Apr. 24, 1981

[51] Int. Cl.³ .......................................... H04M 11/02
[52] U.S. Cl. ............................... 179/84 C; 179/84 SS
[58] Field of Search ................. 179/84 R, 84 L, 84 C, 179/84 SS, 2 A, 6.16, 51 AB, 51 C

[56] References Cited

U.S. PATENT DOCUMENTS

| | | | |
|---|---|---|---|
| 2,525,840 | 10/1950 | Sterrett et al. | 179/19 |
| 2,652,455 | 9/1953 | Lomax | 179/18 |
| 2,678,969 | 5/1954 | Lomax | 179/27 |
| 2,767,249 | 10/1956 | MacDonald | 179/18 |
| 3,187,108 | 6/1965 | Clin et al. | 179/84 C |
| 3,651,270 | 3/1972 | Lee, Jr. et al. | 179/18 B |
| 3,654,396 | 4/1972 | Biezeveld | 179/18 D |
| 3,694,584 | 9/1972 | Gimbert | 179/18 D |
| 3,699,265 | 10/1972 | Altenburger | 179/19 |
| 3,777,069 | 12/1973 | Lee | 179/84 L |
| 3,909,543 | 9/1975 | Miller | 179/18 B |
| 3,936,617 | 2/1976 | Bolgiano | 179/84 R |
| 4,045,619 | 8/1977 | Harrington | 179/180 A |
| 4,046,970 | 9/1977 | Castleman | 179/82 L |

FOREIGN PATENT DOCUMENTS

| | | | |
|---|---|---|---|
| 624684 | 8/1961 | Canada | 179/84 C |
| 2607933 | 9/1977 | Fed. Rep. of Germany | 179/84 C |

*Primary Examiner*—G. Z. Rubinson
*Assistant Examiner*—James Dwyer

*Attorney, Agent, or Firm*—David Pressman

[57] ABSTRACT

A controllable, alternative annunciator for connection to a subscriber's telephone line 14 (the regular telephone ringer being turned off or disconnected) for providing subscriber-controllable annunciation. When not set for a specific function, the annunciator provides a group of chimes (36) in response to each incoming ring signal. The annunciator can be set to be silent under certain electronically, predetermined conditions. Specifically it provides the following controlled functions: (a) non-chiming for selected intervals (24), (b) chiming only after the first three ring signals (26L), (so that a secretary can answer a normally ringing extension before an executive hears any chime), (c) non-chiming after the first ring signal (26R) (to prevent repetitive ringing signals which might disturb a sleeper), (d) chiming only after a caller rings according to a predetermined code (28) (to prevent chiming from unwanted callers). The coded ringing (d) can either be allowance of chiming only after a caller rings for a predetermined relatively long period (by which time an uninformed caller would hang up), or (2) allowance of chiming if a caller rings twice, hangs up, and calls again within a predetermined period. The controlled functions are implemented by converting incoming ring signals to DC pulses (46B) and employing controlled chime oscillators, (40) timers, (42) counters, (42) and other interconnected logic and control circuitry (44–78) to process the pulses according to the desired function.

10 Claims, 2 Drawing Figures

BLOCK DIAGRAM

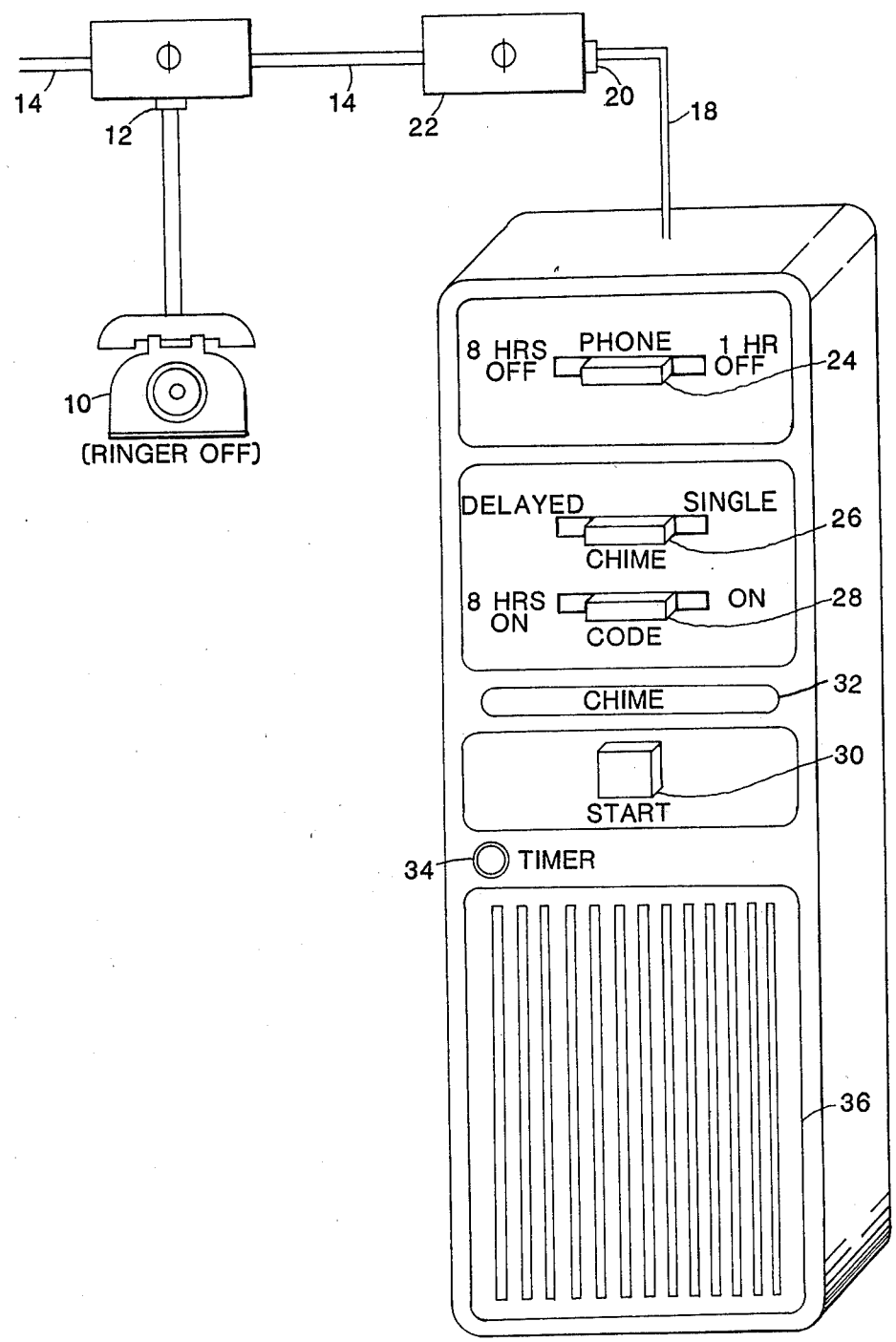
FIG. 1   CONTROLLABLE CALL ANNUNCIATOR

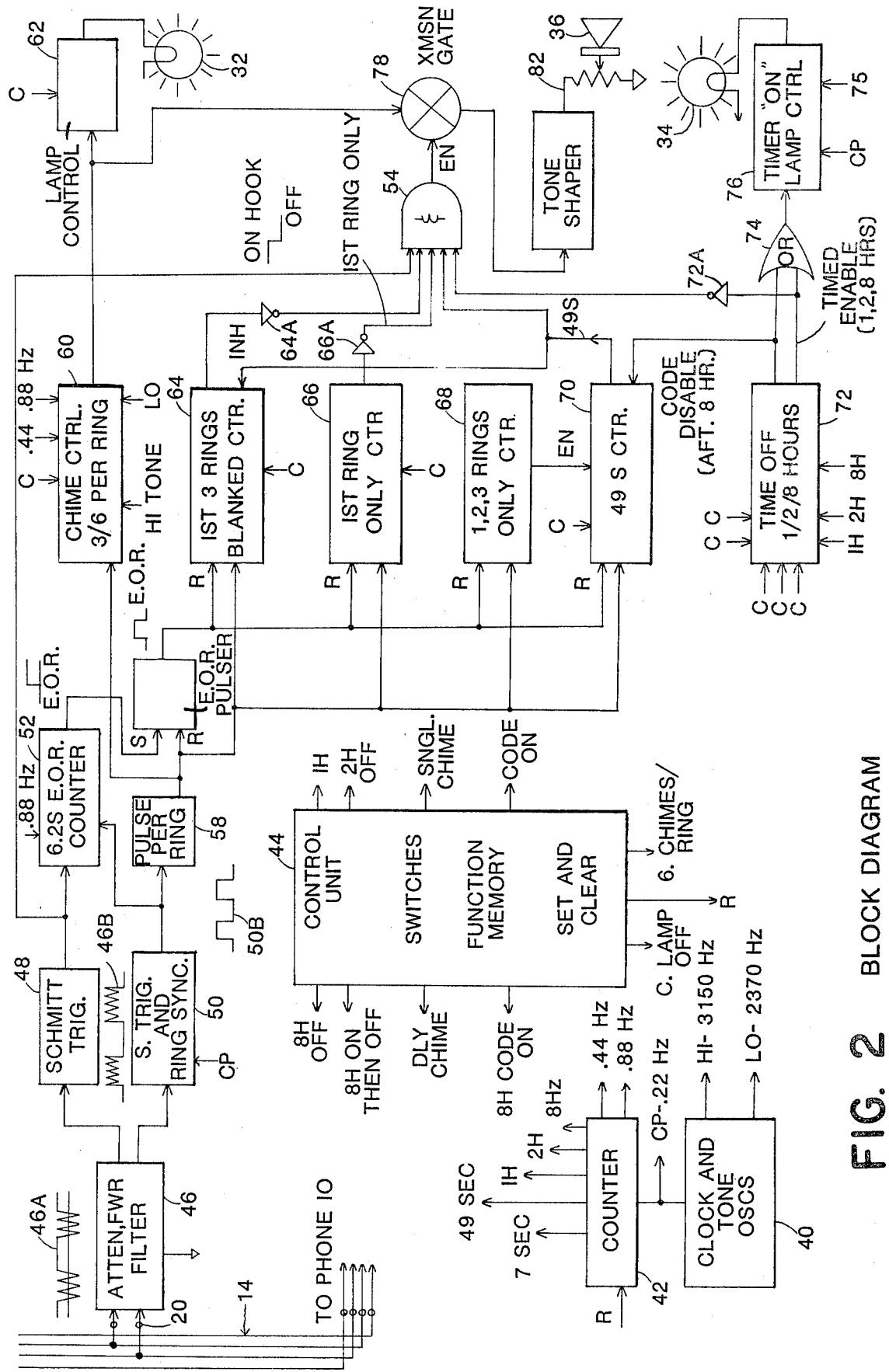
FIG. 2 BLOCK DIAGRAM

CONTROLLABLE TELEPHONE CALL ANNUNCIATOR

FIELD OF INVENTION

This invention relates to telephone systems, particularly to a telephone call annunciator for use in lieu of the regular bell supplied with almost all telephones. More particularily, it relates to such an alternative annunciator wherein the audible output is selectively controllable by the subscriber according to certain specified functions.

DESCRIPTION OF PRIOR ART

Heretofore the standard telephone included a electromagnetically-operated bell which was responsive to an AC ringing signal for announcing an incoming telephone call. This bell could be turned down, or sometimes turned off, by a subscriber who desired that the telephone not ring. However, turning off or turning down the telephone bell is fraught with disadvantages. First, the subscriber may forget that the bell is turned down or off and thereby may forget to turn it back on when it would have been desirable to receive incoming calls, whereby the subscriber may miss important calls. Also, turning down or turning off the bell would block all incoming calls and this is disadvantageous since the subscriber may desire to receive calls from certain parties, but not others.

One system has been proposed for cutting off a subscriber's entire telephone line for a predetermined period; however, this system is fraught with serious disadvantages since it prevents the use of the telephone for outgoing calls.

Accordingly it is one object of the present invention to provide a telephone call annunciator which can be selectively controlled for either variable off periods or by the use of other means, whereby certain callers are able to call the subscriber, even through the subscriber's call annunciator is turned off for all other purposes.

Another drawback of prior telephone ringing systems was the fact that all phones on a given set of extensions connected to a single telephone line rang simultaneously. However, this is not desirable where a person who had one extension would not want to be disturbed by a ringing telephone, but would want to answer the telephone if someone were not available at another extension to answer a call. Such an instance would occur where a sleeping party or an executive was situated ajacent to one telephone and an awake party or a secretary, respectively, were adjacent another telephone: the sleeping party or the executive would not want to be disturbed by the telephone if the awake party or the secretary were available to answer the other extension but would want to be disturbed if no one were available to answer the extension.

Accordingly it is another object of the present invention to provide a telephone call annunciator where one party will not be disturbed by a ringing telephone if someone is available to answer an extension, but will be alerted to the telephone call and will be able to answer it if someone is not available at the extension to answer the call.

Another drawback of prior telephone systems was the fact that telephone calls were announced by a repetitive signal which would ring as many times as the calling party allowed the phone to ring. This was disadvantageous in situations where a sleeping party, such as a baby, would be awakened by repetitive rings, yet such repetitive rings might not be necessary to alert an awake person to the existence of an incoming call.

Another drawback of prior telephone systems was their inability to be turned off for controlled periods during which a subscriber would not want to be disturbed by any ringing telephones for any purposes, yet, as stated, might not remember to turn the telephone back on when resumption of ringing would be desired. For example, in the case of a subscriber who wanted to be undisturbed during eating, sleeping, sexual activity, meetings, etc., it would be desirable to turn the phone off for a controlled period, yet have service automatically resume at the end of such time. It is accordingly another object of the invention to provide a telephone system whereby the riging function can be turned off for certain preset controlled periods and automatically resume thereafter.

Further objects and advantages of the invention will become apparent from consideration of the ensuing description thereof.

DRAWINGS

FIG. 1 is an isometric view of a controllable-call annunciator according to the invention.

FIG. 2 is a block diagram of an electronic system used within said annunciator.

FIG. 1—CONTROLLABLE CALL ANNUNCIATOR AND FUNCTIONS

FIG. 1 shows a controllable call annunciator according to the invention. It is designed for use in association with a standard telephone system employing a standard telephone 10 which is connected via a plug and receptacle 12 to a telephone line 14. Call annunciator 16 includes a cord 18 and plug 20 which is mated with a receptacle 22, also connected to telephone line 14, such that annunciator 16 and telephone 10 are connected in parallel to line 14. In lieu of using separate receptacles 12 and 22, plug 20 may be inserted into another outlet, when available, on receptacle 12, phone 10 may be plugged into an outlet on annunciator 16 (not shown), etc.

The ringer on phone 10 should be turned off or disconnected.

Annunciator 16 includes three slide switches, as follows: Phone On Switch 24, Chime Switch 26, and Code Switch 28. Also, it includes a Timer Start Switch 30, a Ring Indicator Lamp 32, a Timer On Lamp 34, and a loudspeaker or other audio transducer 36. (Loudspeaker 36 is shown covered by a grille). Annunciator 16 contains a source of energy, such as three 1.5 V "A" cells, but any other source of suitable energization may be employed.

Annunciator 16 has a plurality of different functions which are discussed under the respective headings below, which indicate the positions of slide switches 24, 26, and 28.

(A) Normal Chiming: (Phone: ON, Chime: NORMAL, Code: OFF)

With phone switch 24 in its center ("ON") position, chime switch 26 in its center ("NORMAL") position, and code switch 28 in its center ("OFF") position, the annunciator will operate in a "normal" mode. In this mode, for each ring of a incoming call, speaker 36 will emit three chimes, each about 0.5 second in duration.

The first two chimes are each a relatively high tone (3150 Hz) having a relatively high initial volume, but diminishing in intensity thereafter to mimic a mechanical chime, and the third chime being a relatively low tone (2370 Hz) of similar tapering intensity. Thus if ten incoming rings are received on line 14, regular phone 10 will not emit any sound since its ringer is turned off, but annunciator 16 will emit thirty chimes in ten groups of three chimes per group, each group consisting of the "High-High-Low" sequence described. This provides a pleasant alternative to the normal telephone bell.

As an alternative to the three-chimes-per-ring mode, the annunciator can be set to provide six chimes per ring indefinitely by pushing start button 30 twice within one second. In this case, for each incoming ring, speaker 36 will emit six chimes of about 0.22 second duration each. Each group of six chimes will consist of four high chimes, followed by two low chimes. The annunciator can be reset to the three-chime-per-ring mode by placing all three switches 24, 26, and 28 in their center positions and pushing start button 30 twice within one second.

(B) Chime Off for 8 Hours: (Phone: 8 HRS OFF, Chime: NORMAL, Code: OFF)

With slide switches 24, 26, and 28 set in the above positions, annunciator 16 will not announce any incoming calls for a period of eight hours after start switch 30 is pushed once. During this eight-hour period, timer lamp 34 will blink briefly once every 7 seconds to indicate that the annunciator is turned off and that no incoming calls will be audible. However, during the 8-hour-off period, chime lamp 32 will continue to blink, either three or six times for each incoming ring, depending upon which ring frequency function has been selected.

At the expiration of the eight-hour period, timer lamp 34 will cease blinking and calls will be announced normally (three or six chimes per ring) on speaker 36.

The "8 HRS OFF" function is most useful to subscribers who wish to be undisturbed by any ringing phone for eight hours, e.g., during a sleep period.

As an alternative to the 8 HRS OFF function, annunciator 16 can be set to be on (normal chime) for eight hours, and then off indefinitely. To do this phone switch 24 would be put in the 8 HRS OFF position and start button 30 would be pressed twice within 1 second. During the indefinite "Chime Off" period, which will start eight hours after start button 30 is pressed twice, timer lamp 34 will blink. This function is mose useful to a executive whose secretary is absent for a day: the executive can set his/her phone to ring normally for an eight-hour period when the secretary is absent, and then revert to its normal "Chime Off" function.

(C) Chime Off For One Or Two Hours: (Phone: 1 HR OFF, Chime: NORMAL, Code: OFF)

Annunciator 16 can be set to a non-chiming function for a period of one hour by moving switch 24 to the right and pressing start button 30 once. As with the eight-hour off function, during the one-hour off function, chime lamp 32 will blink three times during each incoming ring and timer lamp 34 will blink one every 7 seconds. At the end of the one-hour off period, lamp 34 will stop blinking, and speaker 36 will announce incoming calls normally. To set the timer for a second subsequent one-hour off period, start 30 button is pressed once again.

Annunciator 16 may also be set to be non-chiming for a two-hour period by moving phone switch 34 to the one-hour-off position and pressing start button 30 twice instead of once; all functions will be the same as they were in the one-hour-off period, except that the off period will last for two hours.

This function is most suitable for subscribers who do not wish to be disturbed by telephone calls for a one or two-hour period, e.g., during a meeting, sexual activity, a mealtime, etc.

(D) Delayed (Executive) Chime: (Phone: ON, Chime: DELAYED CHIME, Code: OFF)

With the switches set in the above positions, on incoming calls, the first three rings will not sound, but the fourth and all subsequent rings will sound through speaker 36 in the normal three-(or six) chime-per-ring fashion.

This function may be termed an "executive" function as it is most suitable for an executive's phone where the executive would not wish to be disturbed by incoming calls unless the executive's secretary were absent. The secretary would normally answer the phone within the first three rings, but if the secretary were absent, the executive's phone annunciator would start chiming on the fourth ring to alert the executive to an incoming call so that it could be answered.

(E) Single Chime Per Call (Baby Asleep): (Phone: ON, Chime: SINGLE CHIME, Code: OFF)

With the switches set in this position, for each incoming call, speaker 36 will chime three (or six) tones on the first ring only; no chime will sound on the second or any further rings.

This function is most suitable when two persons (e.g., a parent and a baby) are in a residence and repetitive rings would awaken the baby, but a single ring would be heard by the parent, even though the parent would not be able to answer the phone immediately after the first ring. By chiming only once, regardless of the number of incoming ring signals actually received by the subscriber, annunciator 16 will alert the parent to an incoming call without awakening the baby. Moreover the parent does not have to rush to answer the phone since the caller will continue to hear the phone ringing normally, although it will be silent at the subscriber's end.

(F) Ring On Coded Call Only (Personality Screen): (Phone: ON, Chime: NORMAL, Code: ON)

With the switches in these positions, annunciator 16 will not chime unless a caller rings in a prearranged fashion, specifically, the caller has a choice of two different methods to make a call audible. In the first method, the caller would allow the phone to ring for over 49 seconds; the annunciator will begin chiming on all rings that come in after 49 seconds have elapsed. Since each ring cycle is is about 5 seconds, annunciator 16 will be silent for about the first 10 rings, whereafter it will chime normally (three or six tones per ring) on the ninth and each subsequent ring. This requirement of extended ringing in order to signal the subscriber would cause most callers (who are not aware of the need for extended ringing) to hang up by the eighth ring, whereas as informed caller would allow the phone to ring for more than 10 times, knowing that it would start chiming at the subscriber's end only at the eleventh ring.

As a second alternative coded ring feature, a caller would be able to signal the subscriber by ringing twice, hanging up, and calling back within six to 49 seconds after the hang up. The annunciator will not chime on the first call, but will chime normally on the second call.

Thus it will be apparent that a caller has a choice of two different modes of coded calling, either to ring for longer than ten rings, or to ring twice, hang up, and ring again. The use of the second coded mode (ring twice, hang up, and call again) may be more convenient to those callers who have pushbutton telephones where calling can be effected much more rapidly than with dial telephones.

This "Ring On Coded Call Only" feature is most useful to persons, such as personalities, who wish to receive calls from selected callers only, without having to have an unlisted telephone.

(G) Coded Only Ringing For Eight Hours: (Phone: ON, Chime: NORMAL, Code: 8 HRS ON)

This mode is identical to the previous "Coded Ringing Only" mode, except that coded call screening will be in effect for only eight hours from the time start button 30 is pressed, whereafter annunciator 16 will revert to normal chiming.

This feature is useful where a subscriber does not wish to receive general calls for an eight-hour period, but is willing to receive all calls after the expiration of the eight-hour period.

(H) Combination of Functions

It is possible to combine the functions of switches 24, 26, and 28 in almost any desired manner. For example, if phone switch 24 is set to 8 HRS OFF and chime switch 26 is set to DELAYED CHIME, no chimes will sound for eight hours after start button 30 is pressed, whereafter the annunciator will function in the DELAYED CHIME (ring on fourth and subsequent rings only) mode.

As an example, if chime switch 26 is set to SINGLE CHIME and code switch 28 is set to ON, only calls which ring according to the predetermined code (more than ten rings or ring twice, hang up and call again) will be able to make the annunciator chime. When the annunciator does chime (on the eleventh and subsequent ring; or on the first ring of the second call) it will chime but once.

Other combinations of functions can be provided with other combinations of switch settings.

(I) Chime Lamp Off

If operation of chime lamp 32 is not desired, it can be disabled (in order to prolong the battery life or in order to avoid disturbing a sleeper sensitive to light) by setting switch 28 to 8 HRS ON and pressing start button 30 twice within one second. Lamp 32 will thereupon be disabled, but the code function will not be implemented.

To reset any function e.g., two-hour-off or one-hour-off, make chime lamp 32 operative again, or cause the annunciator to chime thrice per ring rather than the optional six chimes per ring, all three switches 24, 26, and 28 should be set to their center positions and start button 30 should be pressed twice within one second.

FIG. 2—BLOCK DIAGRAM—DESCRIPTION

FIG. 2 is a block diagram of an electronic system for implementing the functions provided by annunciator 16 of FIG. 1.

Various waveforms are indicated where appropriate. Starting at the bottom left corner of the diagram, block 40 represents the master oscillators for driving the system; these provide a high tone output of 3150 Hz, a low tone output at 2370 Hz and clock pulses (CP) at 0.22 Hz (4.55 pulses per second). The clock pulses are supplied to a counter 42 as well as various other components in this system; these are identified as having an arrowhead with a legend "CP" adjacent thereto.

Counter 42 is a count up counter which receives a 0.22 Hz pulses from clock and tone oscillators 40 and supplies two outputs at a lower frequency, 0.44 Hz (2.27 pulses per second) and 0.88 Hz (1.14 pulses per second), as well as output pulses at the following slower periods: 7 seconds, 49 seconds, one hour, two hours, and 8 hours. I.e., the pulse at each of the slower outputs occurs at the intervals specified and the pulse itself is of relatively short duration, namely 0.11 second. Counter 42 also includes a reset input (labelled "R") which when high, causes all of the counters in box 42 to reset. Resetting is done whenever a new timing cycle is to be started.

Control unit 44 includes the switches 24, 26, 28, and 30 of FIG. 1, together with various other memory, reset, and set and clear functions well known in the computer microprocessor art. Unit 44 supplies the following outputs from its switch functions: one hour off, two hours off, eight hours off, single chime, delay (dly) chime, code on, and eight hours code on. In addition, unit 44 also supplies a six-chime-per ring control output, a chime-lamp-off output, and a reset output. The control outputs of unit 44 are connected to various other functional blocks in the system and are indicated by an arrowhead with the letter "C" adjacent thereto leading into the various boxes which receive a control input. The connections between boxes 40, 42, and 44, on the one hand, and the rest of the boxes in the system are not shown in order to avoid cluttering the drawing and to facilitate explanation. Also not shown are various ancillary circuit features well known in the art, such as control voltage input pull-up circuits, power supply connections, inverters where necessary, amplification where necessary, etc.

Starting in the upper left corner, the system is connected to telephone line 14 via jack 20. In practice jack 20 may have four poles, but as only two are needed, only two are indicated.

Block 46 contains attenuators, a full wave rectifier, and a filter and receives two inputs from the red and green wires of the telephone lines (these wires carry the telephone ringing signals). Box 46 is referenced to ground; it reduces the amplitude of the ringing signal it receives from telephone line 14, full-wave rectifies that signal, and filters the signal to smooth same.

Box 46 supplies outputs (in practice of slightly different amplitudes) to a Schmitt trigger circuit 48 and a Schmitt trigger and ring synchronizing (ring sync) circuit 50. Both Schmitt trigger circuits supply an output of a fixed amplitude whenever the amplitude at its input exceeds a certain value; in other words the Schmitt trigger circuits sharpen and input pulses it receives. In addition circuit 50 shortens the output pulses so that they will be coincident with the leading edges of the clock pulses.

The output of Schmitt trigger circuit 48 is applied to a counter 52 and an AND gate 54.

Counter 52 also receives 0.88 Hz timing pulses and a reset (R) input from ring synch circuit 50; it functions to supply an output of a constant duration as indicated if the pulses at its input are interrupted for greater than 6.2 seconds (7 periods of the 0.88 Hz input pulses). The reset input continually resets counter 52 so that it can perform its function properly. The end of ringing output signal from counter 52 is supplied to an end of ringing (EOR) pulser 56.

A pulse/ring 58 receives the output pulses from ring synch circuit 50, shortens these pulses, and supplies them to a reset input of pulser 56.

Pulser 56 converts the end of ringing steady state signal from counter 52 to a short pulse. In practice pulser 56 consists of a flip-flop which is set by the end of ringing signal and reset by the output of ring pulser 58. The output of ring pulser 58 is also applied to a chime control circuit 60 which, in response to each ring pulse, emits three or six chimes of the high-high-low or high-high-high-high-low-low sequence aforediscussed. Circuit 60 receives a control input, a 0.44 Hz input (to control the three chimes per ring), a 0.88 Hz input (to control the size chimes per ring), a high tone input at 3150 Hz, and a low tone input at 2370 Hz.

A lamp control circuit 62 receives the output of chime control circuit 60 and in response to each incoming burst from circuit 60, pulses ring lamp 32. Lamp conrol circuit 62 receives a control input from control unit 44 to disable lamp 32 when this function is desired.

Counter 64 receives the ring pulses from ring pulser 58 and the end of ringing pulse from EOR pulser 56. Counter 64, in association with its output inverter 64A, functions normally to supply an enabling input to AND gate 54. However, when its control input is high and its inhibitory (INH) input is not present, counter 64 and inverter 64A interrupt their enabling input to AND gate 54 for the first three ring pulses from ring pulser 58, but supply their enabling input for the fourth ring and thereafter. Counter 64 is reset by the end-of-ringing pulse from pulser 56.

The first-ring-only counter 66 also receives the ring pulses from pulser 58, a reset input from EOR pulser 56, and functions, in association with its output inverter 66A, to normally supply an enabling input to AND gate 54. However, when enabled by an control ("C") input and not disabled by the presence of an inhibitory input, counter 66 and inverter 66A supply the enabling input to AND gate 54 on the first ring only, and for the second ring and thereafter terminate the enabling input to gate 54.

A counter 68 also receives the ring pulses and the end of ringing pulse as a reset and normally supplies no output to a counter 70, but will supply an enabling input to counter 70 if counter 68 receives either one, two, or three ring pulses from pulser 58. The output of counter 68 will come after the first, second, or third pulse from pulser 58; if pulser 58 supplies four pulses to counter 68, no enabling input will be supplied to counter 70.

Counter 70 is a 49-second period counter which receives the ring pulses from pulser 58 and a reset input from pulser 56. If counter 70 does not receive a control ("C") input, it functions, in association with its output inverter 70A, normally to supply an enabling input to AND gate 54. If counter 70 receives a control input from the Code On output of control unit 44 and no enabling input from counter 68, counter 70 also functions to supply a 49-second low or disabling input to AND gate 54 during and from the first ring pulse, thereby to disable AND gate 54 for 49 seconds from the start of ringing. If enabled by an input from counter 68, counter 70 supplies a 49-second high or enabling input to AND gate 54 from the start of its enablement from counter 68. Counter 70 receives the 49-second timing pulse from counter 42 and can receive a "disable-after-eight-hours" signal from a time off selector 72. Counter 70 also supplies the inhibitory input to counters 64 and 66 so that these counters will not function during the 49-second timing period provided by counter 70.

A time off selector 72 receives a one-hour, two-hour, and eight-hour timing signals and the following control signals: one-hour off, two-hours off, eight-hours off, eight-hours code on, and eight hours on and then off. Time off selector 72 supplies a "disable-after-eight-hours" signal (1) to counter 70 so as to enable counter 70 for 8 hours only, when desired, and (2) to OR gate 74. Selector 72 also supplies a time enable signal (one, two, or eight hours) to OR gate 74 and, via an inverter 72A, to AND gate 54. In association with inverter 72A, selector 72 normally supplies an enabling input to AND gate 54, but when selector 72 is enabled by one of its five control inputs, it will supply the enabling signal to AND gate 54 for a fixed, predetermined time period (one, two, or eight hours) only.

OR gate 74 is a standard inclusive OR gate which supplies an output when either of thereby indicating that time period is being controlled by time off selector 72.

In practice, gate 74 with all of the other logic units in the drawing can be implemented by means of either (a) discrete components (transistors, diodes, resistors, etc) which are interconnected together; (6) the separate functional units shown with the interconnections shown, or (c) a monolitic integrated circuit, this last method being preferred since it provides the cheapest, smallest, most reliable, most power-efficient method, providing production quantities justify the initial capital outlay. In one preferred embodiment, the invention was in process of implementation in integrated circuit form by selectively interconnecting uncommitted gates on a semi-custom gate array chip to provide a logic circuit in accordance with the block diagram of FIG. 2. Such chips and the interconnect fabrication service therefor are widely available and the techniques standard and well-known in the art, e.g., from Monosil, 3370 Montgomery Street, Santa Clara, CA 95050.

A timer on lamp control circuit 76 receives the output of OR gate 74, the clock pulses, and a seven-second timing pulse. It functions to energize timer lamp 34 briefly once every seven seconds when it receives an input from OR gate 74.

AND gate 54 receives the five inputs as stated and functions to supply an output to a transmission gate 78 only when its five inputs are high.

Transmission gate 78 receives the chime bursts from chime control circuit 60 and applies them to a tone shaper 80, only when enabled by an output of AND gate 54.

Tone shaper 80 receives the chime burst from gate 78 and functions to diminish the amplitude of the trailing edge of each burst, in order to provide a pleasing chime-like sound. The output of shaper 80 is applied via a volume control potentiometer 82 to speaker 36.

FIG. 2—OPERATION OF SYSTEM

The operation of this system will be described according to its modes of operation discussed above in conjunction with FIG. 1.

(A) Normal Chiming

With all the switches set in the center position, if the annunciator receives normal ringing bursts as shown at 46A (two-second bursts of a 56 V DC voltage, combined with a 100 V rms, 20 Hz ringing tone, separated by three second inactive intervals), these will be attenuated, rectified, and filtered in box 46, producing the intermittent DC pulses shown at 46B. These pulses will be shortened, squared, and synchronized with the clock pulses in box 50, producing the relatively long ring pulses 50B. These pulses are shortened in pulse/ring 58, producing ring pulses 58B. The ring pulses are applied to time chime control circuit 60, where each pulse is normally converted to two high tone bursts followed by a low-tone burst. These bursts are applied to lamp control circuit 62, which pulses lamp 32 on once for each burst.

The bursts from circuit 60 are also applied to transmission gate 78, which normally receives an enabling input from AND gate 54 so that the bursts are applied, via tone shaper 80 and potentiometer 82, to speaker 36, which sounds the normal three-chimes-per-ring signal. The lower four inputs of AND gate 54 are normally enabled, as discussed, and its upper input is enabled by each output pulse of Schmitt trigger 48, these output pulses coinciding with each ring signal.

If control unit 44 is set to provide a six-chime-per-ring output to chime control 60, six chime bursts (four high followed by two low) will be applied via the route discussed to speaker 36, and lamp 32 will light six times for each incoming ring.

(B)/(C) Off For One, Two, or Eight Hours

If control unit 44 is set to supply an 8 HRS OFF signal, a 1 HR OFF signal, or a 2 HR OFF signal, an appropriate output is supplied from control unit 44 to time off selector 72 when start switch 30 (FIG. 1) is pressed. Selector 72 will thereupon supply, in conjunction with its output inverter 72A, a disabling signal to AND gate 54 for the selected time period (one, two, or eight hours), whereupon AND gate 54 will not supply any enabling input to transmission gate 78. Thereby incoming ring bursts will not activate speaker 36, although chime lamp 32 will continue to light during incoming rings. Also, the timed enable output of selector 72 will pass through OR gate 74 to energize lamp control 76, which causes timer lamp 34 to flash once every 7 seconds during the off period.

Conversely if unit 44 is set to supply an 8 HRS ON, then off output, selector 72 will, in conjunction with its output inverter 72A, enable AND gate 54 for eight hours, and then supply a low input to AND gate 54 so that the annunciator will not chime after eight hours.

(D) Delayed (Executive) Chime

If control unit 44 is set to provide a delayed chime output to counter 64, counter 64 in conjunction with its output inverter 64A, will supply a low or disabling input to AND gate 54 during the first three rings and a normal, enabling input to gate 54 thereafter, so that the first three rings will be blanked.

(E) Single Chime Per Call (Baby Asleep)

If control unit 44 is set to provide a SINGLE CHIME output, counter 66 will receive this control, and in conjunction with its output inverter 66A, will enable AND gate 54 for the first ring only, whereafter it will supply a low or disabling input to AND gate 54, so that ony the first ring will cause a chime output.

(F) Ring On Coded Call Only (Personality Screen)

If control unit 44 is set to provide a CODE ON output to 49-second period counter 70, and the caller rings for more than three rings, counter 68 will not supply an input to counter 70, Counter 70 will thereupon supply a 49-second low or disabling input to AND gate 54, whereby speaker 36 will be disabled for the first 49 seconds of ringing.

If the caller rings twice, hangs up, and rings again after a brief delay, counter 68 will sense the first cycle of two rings and supply an enabling input to counter 70. (Counter 68 is set to detect one and three rings only, as well as two rings only, to account for any mismatch between the number of rings heard by the caller and the rings actually received by the subscriber.) The first cycle of two rings will not be heard at speaker 36 since AND gate 54 is disabled by the output of counter 70. Once the first ring cycle is terminated and 6.2 seconds elapses, end of ringing counter 52 and EOR pulser 56 will reset counter 70 and counter 70 will then enable AND gate 54 for 49 seconds in order that the second ring cycle will be audible at speaker 36.

If control unit 44 is set to provide an 8 HRS CODE ON period, time off selector 72 will cause counter 70 to operate in the coded mode for eight hours only and to function as if it had no control input thereafter.

(G) Combination Of Functions

It will be apparent that if control unit 44 is set to provide a combination of control inputs to various functional units in the system, that these will work in combination as described above.

While the above description contains many specifities, these should not be construed as limitations on the scope of the invention, but rather as an exemplification of a preferred embodiment thereof. Various other embodiments will be apparent to those skilled in the art. For example, other chiming outputs can be provided, other transmission logic can be employed in lieu of AND gate 54 (for example a NOR or NAND gate), the time periods can be shortened, lengthened, or programmed for "Off-ON" periods over a 24-hour day 7 day week. Also the number of rings employed and other time periods employed can be changed. Many other ramifications will become apparent to those skilled in the art. Accordingly the scope of the invention should be determined only by the appended claims and their legal equivalents.

I claim:

1. A controllable telephone call annunciator for connection to a telephone line which can supply consecutive ring signals, comprising:
   (a) indicating means for providing a humanly-sensible indication in response to a driving signal supplied thereto,
   (b) gate means having a plurality of inputs and an output arranged to supply said driving signal to said indicating means when all of said inputs thereof are activated,
   (c) coupling means connecting said telephone line to one of the inputs of said gate means such that said one input will be intermittently enabled in correspondence to the respective ring signals on said telephone line, (d) selectable timer means for selectively supplying a timed activating signal to a second input of said gate means, (e) selectable sensing means connected to said telephone line for sensing the occurrence of a predetermined ring signal condition on said telephone line and selectively supplying an activating signal on a third input of said gate means in response thereto, and (f) selection means for manually selecting and initiating operation among said selectable timer means, said selectable sensing means, or both said selectable timer means and said selectable sensing means, whereby said indicating means can be selectively disabled or made operational in a plurality of independent modes.

2. The controllable annunciator of claim 1 wherein said gate means includes (a) a transmission gate arranged to receive a signal at an input thereof and transmit said signal to an output thereof when an enabling input thereof is supplied with an activating signal, and (b) an AND gate, said enabling input being connected to the output of said AND gate, said output of said transmission gate being connected to said indicating means, and said annunciator also including means connecting said input of said transmission gate to said telephone line.

3. The controllable annunciator of claim 1 wherein said selectable timer means is arranged to supply said activating signal to a second input of said gate means for a predetermined time interval and then discontinue the supply of said activating signal to said gate means.

4. The controllable annunciator of claim 1 wherein said selectable timer means arranged not to supply said activating signal to a second input of said gate means for a predetermined time interval and then to supply said activating signal to said gate means after said predetermined time interval.

5. The controllable annunciator of claim 1 further including a second indicating means for supplying a second humanly-sensible indication when said selectable timer means is not supplying said activating signal to said first input of said gate means, whereby users of said telephone can determine when said first indicating means is disabled.

6. The controllable annunciator of claim 1 wherein said selectable sensing means is arranged to sense the persistence of rings on said telephone line for greater than a predetermined period and supply said activating input to said third input of said gate means thereafter.

7. The controllable annunciator of claim 1 wherein said selectable sensing means is arranged to supply said activating input to said third input of said gate means until greater than a predetermined number of ring signals, from 1 to n, where n is a whole number, occur on said telephone line, whereupon said activating input will be terminated.

8. The controllable annunciator of claim 1 wherein said selectable sensing means is arranged to sense a predetermined number of ring signals on said telephone line and supply said activating input to said third input of said gate means thereafter.

9. The controllable annunciator of claim 1 wherein said selectable sensing means is arranged to sense the occurrence of at least one ring signal on said telephone line, the interruption of any ring signals for a predetermined interval, and the resumption of at least one of said ring signals, and only then supply said activating input to said third input of said gate means thereafter.

10. The controllable annunciator of claim 9 wherein said selectable sensing means includes means for providing a predetermined end-of-ringing signal if the ring signals on said telephone line are interrupted for more than a predetermined interval.

* * * * *